US011247089B2

(12) United States Patent
Lacaze et al.

(10) Patent No.: US 11,247,089 B2
(45) Date of Patent: Feb. 15, 2022

(54) CHEMICAL AND BIOLOGICAL WARFARE AGENT DECONTAMINATION DRONE

(71) Applicant: Robotic Research OpCo, LLC, Clarksburg, MD (US)

(72) Inventors: Alberto Daniel Lacaze, Potomac, MD (US); Karl Nicholas Murphy, Rockville, MD (US); Radha Narayanan, Germantown, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 0 days.

(21) Appl. No.: 16/547,977

(22) Filed: Aug. 22, 2019

(65) Prior Publication Data

US 2021/0052930 A1     Feb. 25, 2021

(51) Int. Cl.
*B64C 39/02*       (2006.01)
*A62D 3/30*        (2007.01)
*B64D 1/18*        (2006.01)
*A62D 101/02*      (2007.01)

(52) U.S. Cl.
CPC .............. *A62D 3/30* (2013.01); *B64C 39/024* (2013.01); *B64D 1/18* (2013.01); *A62D 2101/02* (2013.01); *B64C 2201/027* (2013.01); *B64C 2201/12* (2013.01); *B64C 2201/14* (2013.01)

(58) Field of Classification Search
CPC .... A62D 3/30; A62D 2101/02; B64C 39/024; B64C 39/02; B64C 2201/027; B64C 2201/14; B64C 2201/12; A46B 2200/202; B05B 13/005; Y10S 320/34; G21F 9/001; B01D 2259/4583; B64D 1/18

USPC .......... 89/1.11; 588/403; 239/722; 244/17.11
See application file for complete search history.

(56) References Cited

U.S. PATENT DOCUMENTS

| 2,702,171 | A | 2/1955 | Katzenberger |
| 3,053,480 | A | 9/1962 | Vanderlip |
| 3,306,250 | A | 2/1967 | Pitchford |
| 7,069,124 | B1 | 6/2006 | Whittaker et al. |
| 7,186,567 | B1 * | 3/2007 | Sutherland ........... G01N 21/774 |
|  |  |  | 252/299.01 |
| 7,398,946 | B1 | 7/2008 | Marshall |
| 7,959,104 | B2 | 6/2011 | Kuntz |

(Continued)

FOREIGN PATENT DOCUMENTS

| CN | 102050167 | 9/2010 |
| EP | 3459831 | 11/2017 |

(Continued)

OTHER PUBLICATIONS

Office Action for U.S. Appl. No. 15/794,931 dated Oct. 3, 2019; 38 pps.

(Continued)

*Primary Examiner* — Michael D David
(74) *Attorney, Agent, or Firm* — RowanTree Law Group, PLLC; Carson C. K. Fincham

(57) ABSTRACT

A drone that can pour a variety of chemical agents such as oxidizers, silica gelling agents, enzymes, and neutralizers onto areas contaminated with chemical and biological weapons of mass destruction. The use of a drone to destroy the chemical and biological weapons of mass destruction is highly beneficial since it allows the exposed toxic areas to be remotely decontaminated without the presence of humans.

5 Claims, 3 Drawing Sheets

(56) References Cited

U.S. PATENT DOCUMENTS

| | | | |
|---|---|---|---|
| 8,167,234 B1 | 5/2012 | Moore | |
| 8,342,440 B2 | 1/2013 | Papanikolopoulos | |
| 8,639,400 B1 | 1/2014 | Wong | |
| 8,827,200 B2 | 9/2014 | Radu | |
| 8,991,740 B2 | 3/2015 | Olm et al. | |
| 9,108,479 B1 | 8/2015 | Calvert | |
| 9,145,207 B2 | 9/2015 | Moschetta | |
| 9,216,745 B2 | 12/2015 | Beardsley et al. | |
| 9,447,448 B1* | 9/2016 | Kozloski | B64D 1/22 |
| 9,550,400 B2 | 1/2017 | Hutson | |
| 9,611,038 B2* | 4/2017 | Dahlstrom | B05B 13/005 |
| 9,770,703 B1* | 9/2017 | Soliz | B01D 53/02 |
| 9,928,749 B2* | 3/2018 | Gil | B64D 1/00 |
| 9,963,230 B2* | 5/2018 | Borman | B64D 1/22 |
| 10,126,126 B2* | 11/2018 | Clark | G05D 1/0094 |
| 10,540,901 B2* | 1/2020 | Clark | G01C 7/04 |
| 10,730,626 B2* | 8/2020 | Gil | G08G 5/025 |
| 10,775,792 B2* | 9/2020 | Cooper | G06Q 10/083 |
| 10,872,534 B2* | 12/2020 | Clark | G06K 9/0063 |
| 2002/0060267 A1 | 5/2002 | Yavnai | |
| 2004/0012491 A1* | 1/2004 | Kulesz | G08B 21/12 340/506 |
| 2005/0003715 A1 | 1/2005 | Hewitt | |
| 2005/0004723 A1 | 1/2005 | Duggan et al. | |
| 2005/0027412 A1 | 2/2005 | Hobson | |
| 2006/0187017 A1* | 8/2006 | Kulesz | G08B 29/06 340/506 |
| 2006/0190134 A1* | 8/2006 | Ziegler | A47L 11/4011 700/245 |
| 2007/0228214 A1 | 10/2007 | Horak | |
| 2008/0048065 A1 | 2/2008 | Kuntz | |
| 2008/0311894 A1* | 12/2008 | Klein | H04L 41/22 455/414.2 |
| 2009/0228355 A1* | 9/2009 | Dawson | G06Q 30/0277 705/14.73 |
| 2010/0193626 A1 | 8/2010 | Goossen | |
| 2011/0061951 A1 | 3/2011 | Gal | |
| 2011/0226898 A1 | 9/2011 | Smith | |
| 2012/0185129 A1* | 7/2012 | Carrier | F16H 61/456 701/36 |
| 2012/0214550 A1* | 8/2012 | Galaro | H04W 88/08 455/561 |
| 2013/0062153 A1 | 3/2013 | Ben-Tzvi et al. | |
| 2014/0034775 A1 | 2/2014 | Hutson | |
| 2014/0034776 A1 | 2/2014 | Hutson | |
| 2014/0131507 A1 | 5/2014 | Kalantari | |
| 2014/0252166 A1 | 9/2014 | Smith | |
| 2014/0303814 A1* | 10/2014 | Burema | A01B 79/005 701/3 |
| 2015/0014475 A1 | 1/2015 | Taylor | |
| 2015/0136902 A1 | 5/2015 | Green | |
| 2015/0274294 A1* | 10/2015 | Dahlstrom | B05B 13/0278 239/722 |
| 2016/0023755 A1 | 1/2016 | Elshafei et al. | |
| 2016/0114887 A1 | 4/2016 | Zhou | |
| 2016/0130000 A1 | 5/2016 | Rimanelli | |
| 2016/0144358 A1* | 5/2016 | Patel | G16H 40/40 435/287.2 |
| 2016/0207637 A1 | 7/2016 | Campillo | |
| 2016/0368549 A1 | 12/2016 | Davis | |
| 2017/0113797 A1 | 4/2017 | Hogan | |
| 2017/0144771 A1 | 5/2017 | Lukaczyk | |
| 2017/0199979 A1* | 7/2017 | Reiner | G16H 20/40 |
| 2017/0225802 A1 | 8/2017 | Lussier | |
| 2017/0234834 A1* | 8/2017 | Briglin | G01N 1/2273 73/23.4 |
| 2018/0044000 A1 | 2/2018 | Venturelli et al. | |
| 2018/0074488 A1 | 3/2018 | Cantrell | |
| 2018/0079268 A1 | 3/2018 | Sato | |
| 2018/0173245 A1 | 6/2018 | Twining | |
| 2018/0180564 A1* | 6/2018 | Farhart | G01N 27/126 |
| 2019/0009756 A1 | 1/2019 | Jacobs | |
| 2019/0055018 A1 | 2/2019 | Bei | |
| 2019/0174208 A1* | 6/2019 | Speicher | H04W 84/18 |
| 2020/0406773 A1* | 12/2020 | Lacaze | B64C 39/024 |

FOREIGN PATENT DOCUMENTS

| | | |
|---|---|---|
| FR | 2587909 | 9/1986 |
| FR | 3036379 | 11/2016 |
| RU | 2166427 | 9/2000 |

OTHER PUBLICATIONS

Final Office Action for U.S. Appl. No. 15/794,931 dated Mar. 5, 2020; 24 pps.

Office Action for U.S. Appl. No. 15/794,931 dated Jul. 24, 2020; 31 pps.

Wikipedia, "Unmanned Aerial Vehicle", https://en.wikipedia.org/wiki/Unmanned_aerial_vehicle; archived by Internet Archive on Feb. 4, 2016; https://web.archive.org/web/20160204212920/https://en.wikipedia.org/wiki/Unmanned_aerial_vehicle#Autonomy; accessed Sep. 30, 2019 (Year: 2016) (Year: 2016).

Tom Spendlove, "B-Unstoppable, the Tank Drone Hybrid", engineering.com, posted Jun. 18, 2015; https://www.engineering.com/ PLMERP/ArticleID/10288/B-Unstoppable-the-Tank-Drone-Hybrid.aspx, accessed Sep. 20, 2019.

Kashmir Hill, "Joggobot, The Companion Drone That Makes You Run Faster, Longer, Harder", Forbes.com, Jun. 7, 2012; accessed from https://www.forbes.com/sites/kashmirhill/2012/06/07 /joggobot-the-companion-drone-that-makes-you-run-faster-longer-harder/#34124f3d39e5; accessed on Sep. 30, 2019 (Year: 2012).

AAM, "Aerial Survey & LiDAR", http://www.aamgroup.com/services-and-technology/aerial-survey; archived by Internet Archive on Mar 7, 2016; https://web.archive.org/web/20160307161714/http://www.aamgroup.com/services-and-technology/aerial-survey; accessed Sep. 30, 2019 (Year: 2016).

Office Action for U.S. Appl. No. 15/794,944 dated Oct. 3, 2019; 37 pps.

Final Office Action for U.S. Appl. No. 15/794,944 dated Mar. 5, 2020; 28 pps.

Office Action for U.S. Appl. No. 15/794,944 dated Aug. 6, 2020; 32 pps.

Notice of Allowance for U.S. Appl. No. 15/794,944 dated Mar. 24, 2021; 9 pps.

Office Action for U.S. Appl. No. 15/908,376 dated Aug. 30, 2018; 10 pps.

Final Office Action for U.S. Appl. No. 15/908,376 dated Mar. 11, 2019; 10 pps.

McCloud, "Belts and Pulleys", Jun. 14, 2014; 7 pps.

Office Action for U.S. Appl. No. 16/566,788 dated Oct. 10, 2019; 9 pps.

Final Office Action for U.S. Appl. No. 16/566,788 dated Feb. 25, 2020; 9 pps.

X-Carcopter, Expendables 3 drone'), 2013, (https://www.youtube.com/watch?v=4mdxgZM4y-M); 6 pps.

Office Action for U.S. Appl. No. 14/928,648 dated Feb. 22, 2017; 17 pps.

Final Office Action for U.S. Appl. No. 14/928,648 dated Aug. 30, 2017; 11 pps.

Office Action for U.S. Appl. No. 16/566,788 dated Aug. 2, 2021; 10 pps.

* cited by examiner

CHEMICAL AND BIOLOGICAL WARFARE AGENT DECONTAMINATION DRONE

CROSS-REFERENCE TO RELATED APPLICATIONS

None.

BACKGROUND OF THE INVENTION

1. Field of the Invention

The present invention relates to the development of a transformable robot that can pour decontaminant solutions onto areas contaminated with chemical or biological weapons of mass destruction. Also, the different types of decontaminant solutions are capable of destroying chemical and biological weapons of mass destruction simultaneously in cases where sites are exposed to both types of agents. In addition, if the decontaminant solution that is used is non-toxic and environmentally friendly, it can also be poured or sprayed on humans exposed to these agents. The advantage of using the drone or robot for carrying the decontamination solutions remotely is that it avoids the danger associated with humans manually performing this task.

2. Description of Related Art

The statements in this section mostly provide background information related to the present disclosure and may not constitute prior art.

Terrorist threats based on the use of chemical and biological toxins are increasing both in the United States and abroad. The use, and threat of use, of chemical and biological agents in the context of weapons of mass destruction are of paramount concern both to national defense as well as to state and local law enforcement. The threats from chemical toxins and biopathogens are not restricted to terrorism, however. Chemical pollution of water resources is one of the major threats to Sustainable water resources development and management. Chemical pollution can be caused by: poorly treated or untreated municipal and industrial wastewater: pesticide and fertilizer run-off from agriculture; spills and other ship related releases; mining; and other sources. Communicable pathogens like Influenza A (H1N1), *Bacillus anthracia* (anthrax), *Yersinia pestis* (plague) and *Mycobacterium tuberculosis* (TB) have the potential to spread quickly across the planet, and to create global pandemics as the result of international travel by air travel, ships and even routine cross border travel on public transit.

All of these threats can be referred to by the term "toxins." which includes both toxic chemical compounds and biological entities, including, but not limited to, pesticides, blister agents, nerve agents, and biopathogens (e.g., bacteria, bacterial spores, viruses, and toxins). If left without decontamination, toxins can cause death, incapacitation, or permanent harm to humans, animals, or other organisms. Moreover, failure to disinfect to safe levels of communicable pathogens as influenza viruses, bacterial spores and vegetative bacteria can lead to the pandemic spread of infectious diseases.

Some of the different ways that chemical and biological warfare agents can be decontaminated include the use of neutralizers (RU2241509C2), peracids and germinants (U.S. Pat. No. 7,064,241), oxidizers and silica gelling agents (U.S. Pat. No. 6,455,751), enzymes and formulations (EP1928560), using a peroxygen compound with a bleach activator (U.S. Pat. No. 6,360,288) and many other chemical compositions that have been developed. Other decontamination methods include using corona discharge (U.S. Pat. No. 6,455,014) and microwave plasma torches (U.S. patent application Ser. No. 11/409,011) in series for decontaminating the chemical and biological warfare agents.

There have been no reports in the literature on the use of a drone to remotely carry decontamination solutions to sites that are exposed to chemical or biological warfare agents or to pour or spray over humans affected with these agents. In addition, there have been no reports on the use of the drone to carry these solutions for the simultaneous decontamination of chemical and biological warfare agents.

SUMMARY OF THE INVENTION

This invention involves the development of a drone to remotely carry decontamination solutions to sites that are exposed to chemical or biological warfare agents or to pour or spray over humans affected with these agents. The advantage is that humans do not have to get exposed to the sites by a manual decontamination process. Also, these decontaminating agents allow for simultaneous decontamination of chemical and biological warfare agents in the cases where the sites are exposed to both types of warfare agents.

The drones can create a drone corridor containing decontamination solutions and a drone can also be used to decontaminate another drone that is exposed to the chemical or biological warfare agents.

In addition, an emulsifier or a flocculating agent can be added to spread or glob the toxic chemical or biological warfare agents for easy and safe removal and disposal of these agents.

Also, non-toxic and environmentally friendly decontaminant solutions containing oxidants and silica gelling agents can be used to pour or spray on humans that are exposed to these deadly chemical and biological warfare agents without causing additional harm to them.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

DETAILED DESCRIPTION OF THE INVENTION

Figure 1:
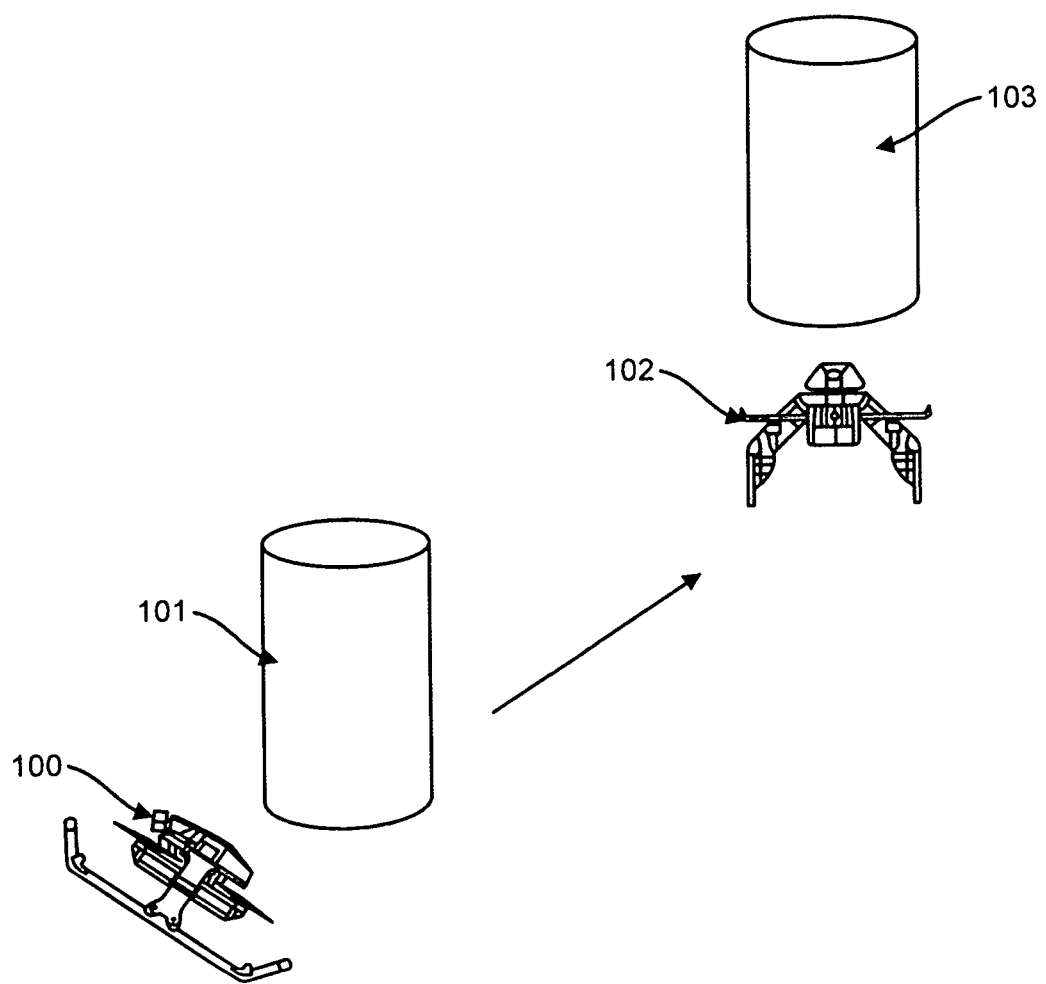
FIG. 1—Image of the transformable drone in the ground mode incorporating the container with the decontaminant solution as part of the payload and then carrying it as part of the payload in the fly in the air mode.

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

The present invention pertains to the development of a chemical or biological warfare agent drone that can be used to decontaminate sites and human beings that are exposed to chemical or biological warfare agents. It also pertains to the use of these drones to simultaneously decontaminate sites and human beings that are exposed to both types of agents together.

Chemical warfare agents chemical substance whose toxic properties are used to kill, injure or incapacitate human beings. Some examples of common chemical warfare agents are synthetic chemicals that can be dispersed as a gas, liquid or aerosol, or as agents adsorbed to particles to become a powder which are extremely toxic. These chemical warfare agents have either lethal or incapacitating effects on humans. Some examples of chemical warfare agents include sarin gas, mustard gas, tear gas, pepper spray, hydrogen cyanide, and chlorine.

Sarin gas is an odorless, colorless liquid used as a chemical weapon because of its effects on the nervous system. Sarin can be fired from a rocket or bomb aerially or released from the ground. It's generally considered a weapon of mass destruction and when fired off, the liquid disperses as an aerosol.

Sulfur mustard, commonly known as mustard gas, is the prototypical substance of the sulfur-based family of cytotoxic and vesicant chemical warfare agents, which can form large blisters on exposed skin and in the lungs.

Tear gas, formally known as a lachrymator agent or lachrymator, sometimes colloquially known as mace, is a chemical weapon that causes severe eye and respiratory pain, skin irritation, bleeding, and even blindness. In the eye, it stimulates the nerves of the lacrimal gland to produce tears.

Pepper spray is an aerosol spray containing oils derived from cayenne pepper, irritating to the eyes and respiratory passages and used as a disabling weapon.

Hydrogen cyanide is a chemical warfare agent (military designation, AC). It is used commercially for fumigation, electroplating, mining, chemical synthesis, and the production of synthetic fibers, plastics, dyes, and pesticides.

Chlorine gas is highly toxic but being a pure element and extremely widely used for peaceful purposes, is not officially listed as a chemical weapon.

Biological warfare agents, which are also known as germ warfare agents, involve the use of biological toxins or infectious agents such as bacteria, viruses, and fungi with the intent to kill or incapacitate humans, animals or plants as an act of war. One of the deadliest biological warfare agents is *Bacillus anthracis*. Other biological warfare agents that are also very dangerous include botulism, brucellosis, plague, ricin, smallpox, and viral encephalitis.

*Bacillus anthracis* is the etiologic agent of anthrax—a common disease of livestock and, occasionally, of humans—and the only obligate pathogen within the genus *Bacillus*. *B. anthracis* is a Gram-positive, endospore-forming, rod-shaped bacterium, with a width of 1.0-1.2 µm and a length of 3-5 µm.

Botulism is a type of food poisoning that is caused by a bacterium (botulinum) growing on improperly sterilized canned meats and other preserved foods.

Brucellosis is a disease caused by a group of bacteria from the genus *Brucella*. These bacteria can infect both humans and animals. Brucellosis is often spread when people eat contaminated food, which can include raw meat and unpasteurized milk. While brucellosis is rare in the United States, it can be serious.

Plague is a serious bacterial infection that can be deadly. Sometimes referred to as the "black plague," the disease is caused by a bacterial strain called *Yersinia pestis*. This bacterium is found in animals throughout the world and is usually transmitted to humans through fleas.

Ricin is a lectin produced in the seeds of the castor oil plant, *Ricinus communis* is a highly potent toxin. A dose of purified ricin powder the size of a few grains of table salt can kill an adult human.

Smallpox is an acute contagious viral disease, with fever and pustules usually leaving permanent scars. It was effectively eradicated through vaccination by 1979.

Viral encephalitis is an inflammation of the brain that is caused by a virus.

The chemical or biological warfare agent drone is comprised of a drone, a detector, a control system to guide the drone to the hot spots, and a decontaminant solution as part of the payload.

The hot spot that the drone is guided to refers to the specific area where the toxic chemical or biological warfare agents are located at the site.

The decontaminant solution refers to the reagent or reagents or chemical composition that are used to neutralize or remove dangerous materials, which are the chemical or biological warfare agents in this case. In the case of using corona discharge and microwave plasma, these are physical decontamination methods that are used.

A corona discharge is an electrical discharge brought on by the ionization of a fluid such as air surrounding a conductor that is electrically charged. Spontaneous corona discharges occur naturally in high-voltage systems unless care is taken to limit the electric field strength.

Microwave plasma is plasma generated by microwaves. Plasma is one of the four fundamental states of matter and was first described by chemist Irving Langmuir in the 1920s. It consists of a gas of ions, atoms which have some of their orbital electrons removed, and free electrons. Microwaves are an electromagnetic wave with a wavelength in the range 0.001-0.3 m, shorter than that of a normal radio wave but longer than those of infrared radiation. Microwaves are used in radar, in communications, and for heating in microwave ovens and in various industrial processes.

In case of the chemical or biological warfare decontaminant drone, one drone senses other drones' decontamination solutions or methods. All the other drones sense all drones' decontamination solutions or methods. The chemical or biological warfare decontamination drones create a decontaminated corridor which is like a long passageway of drones containing the decontamination solutions or methods such as corona discharge or microwave plasma.

The chemical or biological warfare agent creates decontaminated rooms or vehicles and the decontamination is based on the purity which is the concentration level of the chemical and/or biological agents or toxins present at the site or on the humans being exposed to these toxic agents.

The chemical or biological warfare agent decontamination drone decontaminates the outer part of the spill first. The drone also decontaminates the human that was poisoned with the chemical or biological warfare agent by using a non-toxic and environmentally friendly decontamination agent.

The drone also uses the decontaminant to clean other drones that have been contaminated. Multipart decontamination is used in which the first drone drops the first decontamination solution and the second drone drops the second decontamination solution.

The decontamination solution is replaced with a sealer in the chemical or biological warfare agent decontamination drone. The decontaminant solution can also be replaced with an emulsifier/flocculating agent to spread/glob the toxic chemicals or biological warfare agents.

A sealant is a substance used to block the passage of fluids through the surface or joints or openings in materials such as a type of mechanical seal. Sealants may be weak or strong, flexible or rigid, permanent or temporary. Sealants are not adhesives, but some have adhesive qualities and are called adhesive-sealants or structural sealants. A sealant may be viscous material that has little or no flow characteristics and which stay where they are applied; or they can be thin and runny so as to allow it to penetrate the substrate by means of capillary action. Anaerobic acrylic sealants (generally referred to as impregnants) are the most desirable, as they are required to cure in the absence of air, unlike surface sealants that require air as part of the cure mechanism that changes state to become solid, once applied, and is used to prevent the penetration of air, gas, noise, dust, fire, smoke, or liquid from one location through a barrier into another. Typically, sealants are used to close small openings that are difficult to shut with other materials, such as concrete, drywall, etc. Some of the good properties of sealants include insolubility, corrosion resistance, and adhesion. They are used are used widely in many industries such as construction, automotive, and aerospace industries. Sealants can be categorized in accordance with varying criteria, such as the reactivity of the product in the ready-to-use condition or on the basis of its mechanical behavior after installation.

An emulsion is a mixture of two or more liquids that are normally immiscible (not forming a homogeneous mixture when added together). Emulsions are part of a class of two-phase systems of matter called colloids. Although the terms colloid and emulsion are sometimes used interchangeably, the term emulsion should be used only when both phases, dispersed and continuous, are liquids. In an emulsion, one liquid (the dispersed phase) is dispersed in the other liquid (the continuous phase).

Flocculating agents are chemicals that promote flocculation by causing colloids and other suspended particles in liquids to aggregate, forming a floc. process in which colloids come out of suspension in the form of floc or flake, either spontaneously or due to the addition of a clarifying agent. The action differs from precipitation in that, prior to flocculation, colloids are merely suspended in a liquid and not actually dissolved in a solution. In the flocculated system, there is no formation of a cake, since all the flocs are in the suspension. Coagulation and flocculation are important processes in water treatment with coagulation to destabilize particles through chemical reaction between coagulant and colloids, and flocculation to transport the destabilized particles that will cause collisions with floc. Flocculants are used in water treatment processes to improve the sedimentation or filterability of small particles.

The decontamination/sealing/emulsification/flocculation are used in conjunction with each other to decontaminate the spill in specific locations at the site or in the human body. The drone flies to the end from the area from upward direction to remove all contamination.

The chemical or biological warfare agent drone uses wind direction and speed to direct and spread the decontaminant/sealer/emulsifier/flocculating agent.

A transformable robot is used so that the decontamination can happen in areas where a drone is hard to fly or where a drone will spread the container. The transformable robot lands close to the toxic area and then drives to the toxic area to reduce the spread of the toxic chemical or biological warfare agents.

The transformable robot that is used in this application is the hybrid UAV/UGV which consists of a hybrid unmanned aerial vehicle/unmanned ground vehicle.

FIG. 1 shows a schematic of a drone which is a transformable robot that incorporates the container (101) with the decontaminant solution (neutralizer, peracids, enzymes, oxidants with silica gelling agents, peroxygens with active bleaching agents, and many other types of chemical and biological decontaminating agents) as part of the payload in the ground mode (100) and then carries the container (103) as part of the payload in the flight mode (102). The drone can use the drive mode to carry the decontamination solution as part of its payload to the location where the chemical or biological warfare agents are found. If necessary, to reach upwards, the transformable robot can use the flight mode to carry the decontaminant solution as part of its payload and fly towards the location of the exposed site.

The payload in a robot is the weight a robot arm can lift. It includes the weight of the end of arm tooling (EOAT). Maximum payload varies from robot to robot.

A neutralizer is a substance or material that is used in the neutralization of acidic water. It is a common designation for alkaline materials such as calcite (calcium carbonate) or magnesia (magnesium oxide) used in the neutralization of acid waters. A neutralization reaction is when an acid and a base react to form water and a salt and involves the combination of H+ ions and OH— ions to generate water. Some neutralizers have been used for decontamination of chemical warfare agents while others have been used for the decontamination of both chemical and biological warfare agents.

Peracids are acids which contains an acidic —OOH group. The two main classes are those derived from conventional mineral acids, especially sulfuric acid, and the peroxy derivatives of organic carboxylic acids. They are generally strong oxidizers.

Enzymes are a substance produced by a living organism which acts as a catalyst to a specific biochemical reaction. Enzymes have also been used for the simultaneous decontamination of chemical and biological warfare agents as well as each type of agent individually and are also non-toxic and environmentally friendly so can be used on humans exposed to these toxic agents.

Oxidants with silica gelling agents have also been used for simultaneous decontamination of chemical and biological warfare agents as well as each agent individually. These decontaminant solutions are environmentally friendly and non-toxic making them suitable for use on humans that are exposed to the chemical and/or biological warfare agents. Oxidants are oxidizing agents which tends to bring about oxidation by being reduced and gaining electrons. Redox is a type of chemical reaction in which the oxidation states of atoms are changed. Redox reactions are characterized by the transfer of electrons between chemical species, most often with one species undergoing oxidation while another species undergoes reduction.

Peroxygens are a class of chemicals that are highly reactive by nature and should be handled with care. Bleaching agents are dilute solutions of sodium hypochlorite and are agents that are used to remove color from substances. The combination of peroxygens with bleaching agents have been used for the decontamination of chemical and/or biological warfare agents.

Figure 2:
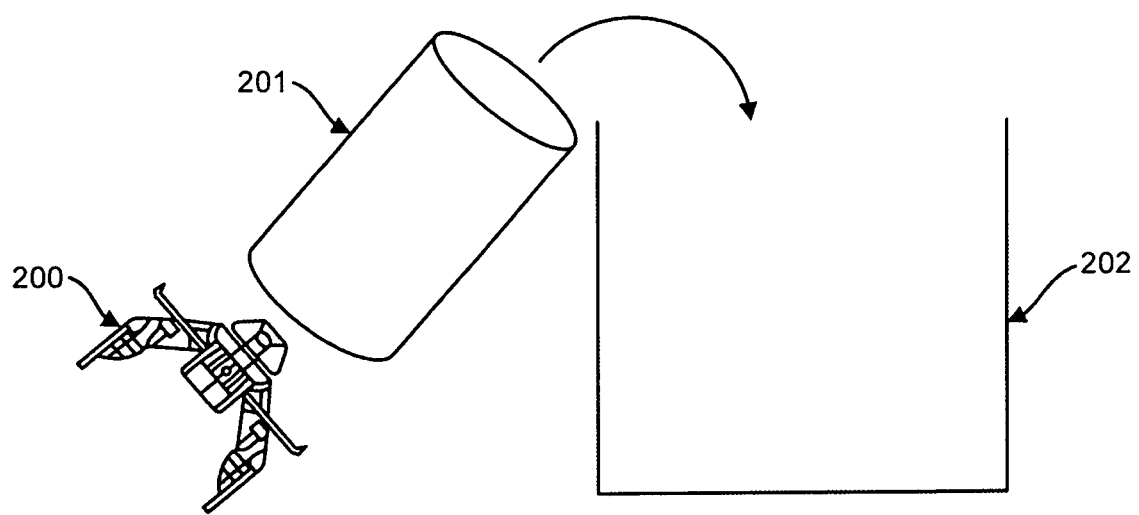
FIG. 2—Illustration of the transformable drone carrying the container with the decontaminant solution and pouring it into the site that is exposed to chemical and biological warfare agents.

FIG. 2 shows an illustration of the transformable robot (200) carrying the container (201) with the decontaminant solution and pouring it onto the area (202) that is exposed to chemical and biological warfare agents. In another embodiment, the decontaminant solution is held in a container containing a spray nozzle and the decontaminant solution is sprayed all across the area that is exposed. This is especially useful in cases where the chemical or biological agents are airborne. The spraying method would be especially effective in decontaminating the presence of the chemical or biological warfare agents present in the air.

Figure 3:
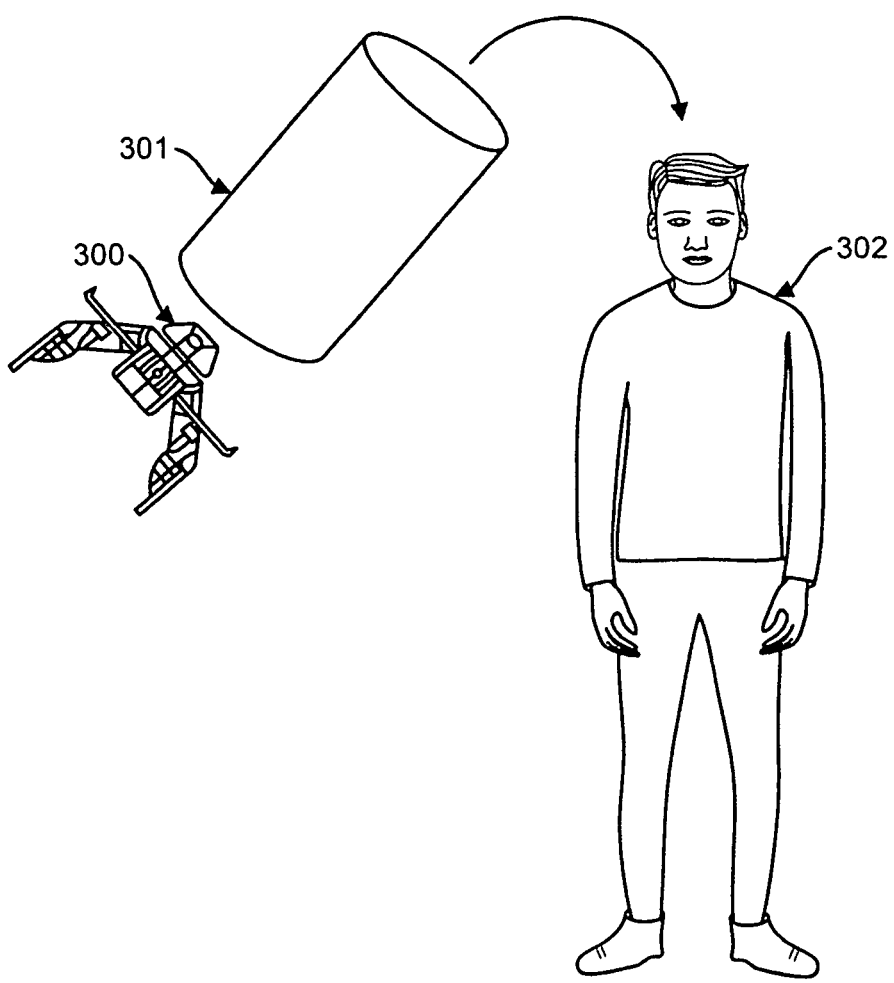
FIG. 3—Illustration of the transformable drone carrying the container with a non-toxic and environmentally friendly decontaminant solution and pouring it on a human being who is exposed to the chemical and biological warfare agent.

FIG. 3 shows an illustration of the transformable robot (300) carrying the container (301) with a non-toxic and environmentally friendly decontaminant solution and pouring it on a human being (302) who is exposed to the chemical and biological warfare agent. One example of a non-toxic and environmentally friendly decontaminant solution involves the use of an oxidant and a silica gelling agent. This type of decontaminant solution can be poured onto human being who is highly exposed to chemical or biological warfare agents throughout the body or sprayed in the case of a smaller level of exposure to these toxic agents.

The embodiments of the invention in which an exclusive property or privilege is claimed as defined as follows:

1. A chemical or biological warfare agent decontamination system, comprising:
 a drone that is transformable between an un-manned ground travel mode in which the drone drives along the ground and an un-manned flight travel mode in which the drone flies above the ground, the drone comprising:
 a detector;
 a control system in communication with the detector, the control system being operable to receive readings from the detector and to guide the drone to a hot spot indicated by the readings; and
 a solution as part of a payload, the solution comprising (i) a sealer and (ii) at least one of an emulsifier and a flocculating agent, and wherein the drone is operable to deploy the payload at the hot spot.

2. The chemical or biological warfare agent decontamination system of claim 1, wherein the drone is operable to deploy the payload onto a human, thereby decontaminating the human that was poisoned using a non-toxic and environmentally friendly decontamination agent.

3. The chemical or biological warfare agent decontamination system of claim 1, wherein the drone is operable to deploy the payload onto another drone, thereby utilizing the solution to clean another drone that has been contaminated.

4. The chemical or biological warfare agent decontamination system of claim 1, wherein the drone comprises at least two drones, and wherein a first payload of a first drone comprises a first solution and wherein a second payload of a second drone comprises a second solution.

5. The chemical or biological warfare agent decontamination system of claim 1, wherein the control system of the drone is operable to use wind direction and speed to direct and spread the payload.

\* \* \* \* \*